No. 785,703. PATENTED MAR. 28, 1905.
W. J. BAYRER.
POWER TRANSMITTING MECHANISM.
APPLICATION FILED FEB. 29, 1904.

Witnesses:
Ethel M. Lowe.
Daniel Westin.

Inventor:
William J. Bayrer
By his Attorney
Harry P. Williams

No. 785,703. Patented March 28, 1905.

UNITED STATES PATENT OFFICE.

WILLIAM J. BAYRER, OF HARTFORD, CONNECTICUT, ASSIGNOR OF ONE-HALF TO FREDERICK R. BOYNTON, OF HARTFORD, CONNECTICUT.

POWER-TRANSMITTING MECHANISM.

SPECIFICATION forming part of Letters Patent No. 785,703, dated March 28, 1905.

Application filed February 29, 1904. Serial No. 195,765.

*To all whom it may concern:*

Be it known that I, WILLIAM J. BAYRER, a citizen of the United States, residing at Hartford, in the county of Hartford and State of Connecticut, have invented certain new and useful Improvements in Power-Transmitting Mechanism, of which the following is a specification.

This invention relates to a power-transmitting mechanism in which rollers are used to effect the connection between the driving part and the driven part.

The object of this invention is to provide a simple and strong mechanism of this nature which is powerful in action and which operates smoothly and quietly without an excessive amount of friction or waste of power.

The driving part may be a shaft driven from any source of power, and the driven part may be a pulley or gear loosely mounted on the shaft, or the pulley or gear may be the driving part and the shaft may be the driven part, according to the use to which the mechanism is applied. In each end of the hub of the pulley or gear is a tapering recess containing a cone and tapering rollers. Preferably there is a single ring of rollers in one recess and two rings of rollers in the other recess. Means are provided for expanding the rollers in the recesses, so that they will engage with the inclined surfaces of the cones and the tapering walls of the recess in the hub. When the double rollers are engaged between the cones and the hub, the pulley or gear will rotate in the same direction as the shaft, and when the single rollers are engaged with the hub the pulley or gear will rotate oppositely to the shaft.

Figure 1:
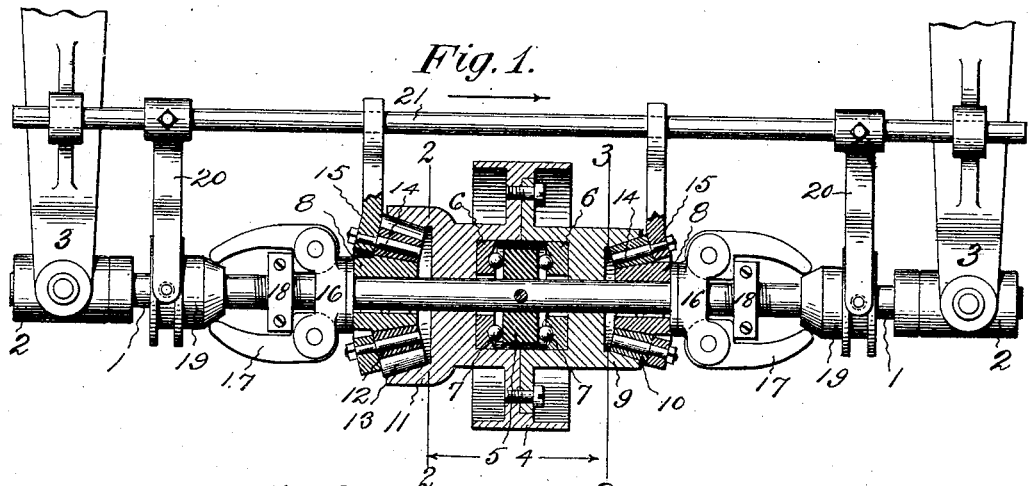
Figure 2:
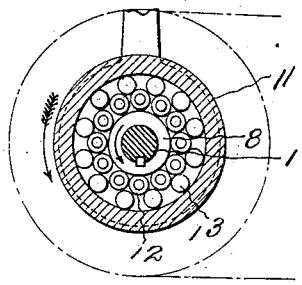
Figure 3:
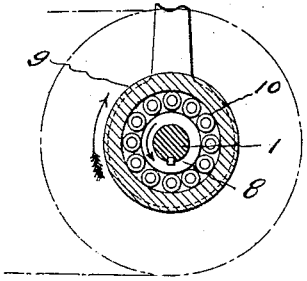
Figure 4:
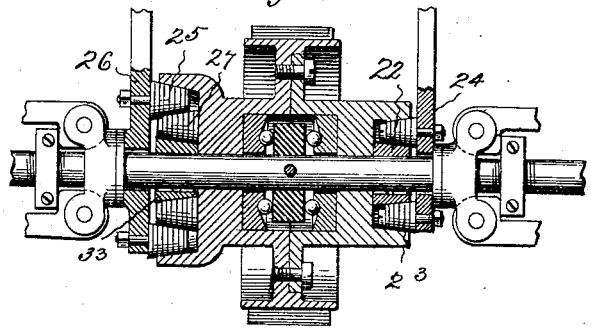

Figure 1 of the accompanying drawings shows an elevation of one form of mechanism which embodies the invention with a portion cut in central section. Fig. 2 shows a transverse section of this form of mechanism on the plane indicated by the line 2 2 looking in the direction indicated by the arrow. Fig. 3 shows a transverse section of the same mechanism on the plane indicated by the line 3 3 looking in the direction indicated by the arrow. Fig. 4 shows a central section of a different form of mechanism that embodies the invention.

The shaft 1 is supported by bearings 2, held by brackets 3.

The pulley 4, which is shown in Fig. 1, is formed in two parts fastened together by screws, each part bearing a section of the hub. In the middle of the hub is a recess containing the collar 5, that is fixed on the shaft, the ball-cases 6, that turn with the hub, and the antifriction-balls 7, that run between the collar and the cases. In each end of the hub is a recess with a tapering wall containing a cone 8, that rotates with but has a movement axially on the shaft. Between the tapering wall of the recess in the hub-section 9 on one side and the inclined surface of the cone in that recess is a single ring of rollers 10, and between the wall of the recess in the hub-section 11 on the other side and the surface of the cone in that recess is an inner ring of rollers 12 and an outer ring of rollers 13. In this form of the invention the rollers at both ends that are engaged by the cones are mounted on pintles 14, supported by frames 15, which are held against rotation.

Movable axially on the shaft outside of each cone is a block 16. Pivoted between ears on each block are levers 17, that are arranged to engage a nut 18, which is adjustably fixed on the shaft and are adapted to be engaged by a wedge 19, that can be moved along the shaft by an arm 20, attached to a shifting rod 21.

When the shifting rod is moved in one direction—for instance, as indicated by the arrow in Fig. 1—the cone on the left is thrust into the recess in such manner that the tapering rollers 12 force the tapering rollers 13 against the tapering wall of the recess. If the shaft is rotated with the parts in this condition, the cone, which rotates with the shaft, causes the rollers 12 to rotate the rollers 13 against the tapering wall of the recess in the hub in such manner that the pulley is rotated in the same direction as the shaft, as indicated in Fig. 2. When the rod is moved in the opposite direction, the cone on the left is withdrawn from the recess, so as to loosen the rollers 12 and 13. This movement if extended sufficiently causes the cone on the right to expand the rollers 10, so that they will firmly engage with the tapering wall of the recess, also with the inclined surface of the cone. If the shaft is rotated with the parts in this condition, the cone, which rotates with the shaft, causes the rollers to so rotate against the wall of the hub that the pulley is rotated in a direction opposite to that of the shaft, as indicated in Fig. 3.

The rollers may be made of single pieces, as shown in Fig. 1, or may be formed in sections, as shown in Fig. 4. In the form of the invention above described the single ring of rollers are free to rotate, but are held by their supporting-frame from revolving and are expanded against the inner wall of the hub by the inward movement of the cone. In this form of the invention, also, the inner of the two rings of rollers at the other end of the hub are held against revolving by their frame, but are free to rotate. The outer rollers cannot revolve, as they are located between the inner rollers; but they are free to rotate. The inward movement of the cone on this side expands the inner rollers and causes them to expand the outer rollers against the inner wall of the hub.

If the power is applied to the shaft, the driven part will be a pulley, as shown in Fig. 1, or a gear, as shown in Fig. 4. Of course the power could be applied to the pulley or to the gear and transmitted to the shaft, if desired, without changing the organization.

Instead of expanding the rollers outwardly against the tapering wall of the recess in the hub by a movable cone, as shown in Fig. 1, a cone 22 may be fixed on the shaft in the recess, and the rollers 23 may be driven in between the inclined surface of the cone and the tapering wall of the recess by forcing the frame 24, that supports the rollers, inwardly, as shown on the right in Fig. 4. If desired, the outer ring of rollers 25 may be mounted on pintles held by a non-rotatable frame 26, which can be arranged to be thrust inward, so as to drive the outer rollers between the tapering wall of the recess in the hub and the inner tapering rollers 27, that engage the cone 33 on the shaft, as shown on the left in Fig. 4. In this form of the invention forcing in the single ring of rollers causes the gear to be rotated in a direction opposite to the direction of rotation of the shaft and forcing in the outer of the two rings of rollers causes the gear to be rotated in the same direction as the shaft.

Where the driving and driven parts are connected by the engagement of the double rings of rollers, the rotation of the shaft and cone causes the rotation of the inner rollers, which cause the rotation of the outer rollers in a direction that tends to impart a forward motion to the hub of the pulley.

A power-transmitting mechanism having a single ring of rotating rollers on one side and two rings of rotating rollers on the other side between the driving and the driven part is simple to construct, durable in use, and powerful in action. The driving part can be continuously rotated in one direction, and if the double rollers on one side are engaged the driven part is rotated in the same direction, and if the single rollers on the other side are engaged the driven part is rotated in the opposite direction. Without changing the direction of rotation of the driving part the driven part may be rotated in either direction, as desired. The action of these rollers is such that the friction is reduced to a minimum amount, and yet little power is lost and the mechanism starts forwardly or backwardly easily and smoothly, as the rollers simply rotate until they pinch with sufficient force to set the driven part in motion.

The invention claimed is—

1. A power-transmitting mechanism having a driving part, a driven part, rollers in a single ring located between the driving and the driven parts, rollers in two rings located between the driving and the driven parts, and means for engaging and disengaging the rollers between the driving and the driven parts, substantially as specified.

2. A power-transmitting mechanism having a driving part, a driven part, rollers in a single ring located between the driving and the driven parts, rollers in two rings located between the driving and the driven parts, means movable along and rotatable with the driving part for causing the single ring of rollers to engage between a part that rotates with the driving part and also with the driven part, and means movable along and rotatable with the driving part for causing the two rings of rollers to engage between a part that rotates with the driving part and also with the driven part, substantially as specified.

3. A power-transmitting mechanism having a driving part with tapering recesses, a driven part, cones movable along and rotatable with the driving part, a single ring of rollers between the surface of one of the cones and the wall of one tapering recess, two rings of rollers between the surface of the other cone and the wall of the other tapering recess, and means for moving the cones, substantially as specified.

4. A power-transmitting mechanism having a driving part with tapering recesses, a driven part, cones movable along and rotatable with the driving part, a single ring of rollers between the surface of one cone and the wall of one tapering recess, a frame holding these rollers against revolution, two rings of rollers between the surface of the other cone and the wall of the other tapering recess, a frame holding one ring of these rollers against revolution, and means for moving the cones, substantially as specified.

5. A power-transmitting mechanism having a driving part with tapering recesses, a driven part, a single ring of rollers located in one recess, two rings of rollers located in the other recess, and means for driving the rollers into the recesses and causing them to engage between the driving and the driven parts, substantially as specified.

6. A power-transmitting mechanism having a shaft, a pulley loosely mounted on the shaft and having tapering recesses in its hub, cones mounted on the shaft in the recesses, a single ring of tapering rollers located between the surface of one cone and the wall of one recess, two rings of tapering rollers located between the surface of the other cone and the wall of the other recess, means for preventing the revolution of the rollers, and means for forcing the cones into engagement with the rollers and the rollers into engagement with the walls of the recesses, substantially as specified.

7. A power-transmitting mechanism having a shaft, a collar fixed on the shaft, a pulley rotatable on the shaft and having tapering recesses in its hub, balls arranged between the pulley and the collar, cones rotatable with the shaft in the recesses, a single ring of tapering rollers located between the surface of one cone and the wall of one recess, two rings of tapering rollers located between the surface of the other cone and the wall of the other recess, and means for causing the rollers to engage between the surfaces of the cones and the walls of the recesses, substantially as specified.

8. A power-transmitting mechanism having a shaft, a collar fixed on the shaft, a pulley rotatable on the shaft and having tapering recesses in its hub, cones rotatable with the shaft, tapering rollers at each end of the hub between the surfaces of the cones and the walls of the recesses, and means for causing the tapering rollers to engage between the surfaces of the cones and the walls of the recesses, substantially as specified.

WILLIAM J. BAYRER.

Witnesses:
HARRY R. WILLIAMS,
ETHEL M. LOWE.